DIGITAL FM SWEEP GENERATOR

Filed May 23, 1968 2 Sheets-Sheet 1

INVENTORS.
HENRY ROBERTS
MAURICE EPSTEIN
EARL HEIER

INVENTORS.
HENRY ROBERTS
MAURICE EPSTEIN
EARL HEIER

United States Patent Office 3,548,320

Patented Dec. 15, 1970

3,548,320

DIGITAL FM SWEEP GENERATOR

Henry Roberts, Fair Lawn, N.J., and Maurice Epstein and Earl Heier, Ardsley, N.Y., assignors, by mesne assignments, to the United States of America as represented by the Secretary of the Navy Filed May 23, 1968, Ser. No. 731,532
Int. Cl. H03k *21/36*
U.S. Cl. 328—46 7 Claims

ABSTRACT OF THE DISCLOSURE

The circuits of the present invention produce frequency modulated signals having an up or down sweep by periodically advancing the count registered in a counter from a preset number to a preselected different number and then resetting this counter to successively higher or lower numbers. Each time the counter reaches the preselected number, an output pulse is produced. If the counter is started from successive higher numbers in consecutive cycles, the time between these output pulses is correspondingly reduced. If it is started from successive low numbers, this time is increased. A square wave form is generated from these output pulses and this wave form is then filtered to produce a sinusoidal frequency modulated signal with either an up or down sweep. The apparatus for resetting the counter includes a second counter which is either advanced or set back from a preset count each time the first counter reaches the preselected number, and the count registered in this second counter determines the number at which the first counter starts during any particular cycle.

The invention described herein may be manufactured and used by or for the Government of the United States of America for governmental purposes without the payment of any royalties thereon or therefor.

The present invention relates generally to apparatus for and methods of producing highly reproducible frequency modulated signals.

Frequency modulated signals or sweeps, also referred to as "chirps," are commonly utilized in long range, surveillance sonars or radars which employ correlation techniques for enhancing signal detectability. This type of signal provides the detecting system with recognized advantages while considerably reducing the required transmitted power level. Also, because frequency modulated sweeps have a high Doppler tolerance, a lesser number of processing channels are needed at the receiving apparatus.

These frequency modulated sweeps have been produced or simulated by a number of different techniques that include, for example, voltage controlled oscillators, voltage controlled astable multivibrators, or sets of discrete, closely spaced, increasing or decreasing signal frequencies. Although sinusoidal or square wave frequency modulated signals can be readily produced by the first two methods just cited, both require a variable voltage whose time dependency must be as accurate as the degree of signal reproducibility desired.

The third arrangement does not suffer from this limitation since it derives the basic frequency modulated sweep from a set of discrete but slightly displaced frequencies that are sequentially sampled in a phase coherent manner. The set of fixed frequencies utilized in this method are usually derived from a precision oscillator by frequency synthesizer techniques. Thus, the over-all accuracy of the generated signals corresponds to the accuracy of the oscillators themselves. However, the complexity needed to provide and maintain the phase coherency at frequency switchover time tends to make this over-all process somewhat impractical for other than laboratory applications. Another method for generating these frequency modulated sweeps involves mechanically altering the frequency setting of an oscillator but here, too, the system is relatively complicated since it involves mechanical and electrical mechanisms and their control circuits.

It is accordingly a primary object of the present invention to provide a method for generating highly accurate frequency modulated signals.

Another object of the present invention is to provide a frequency modulated signal whose basic accuracy is determined bv a high quality oscillator and its quantization.

Another object of the present invention is to generate frequency modulated signals by utilizing a digital "nibbling" technique wherein successive half cycles or sets of cycles are shortened or lengthened from preceding half cycle or sets of cycles by finite amounts.

Other objects, advantages and novel features of the invention will become apparent from the following detailed description of the invention when considered in coniunction with the accompanying drawings wherein.

The present invention employs a so-called digital "nibbling" technique to develop a highly reproducible frequency modulated wave form. The manner in which this "nibbling" technique works may, perhaps, best be understood by examining wave form A in FIG. 1. The first half cycle of this square wave has a period T, and this period is shortened by $\tau_1$ to produce the second half cycle $T-\tau_1$. The third half cycle is likewise reduced from its predecessor by $\tau_1$ so that its period is $T-2\tau_1$, and this process is continued. The net result of this successive shortening is a quantized frequency modulated signal with an upsweep.

Each half cycle of the signal or "chirp" is thus "nibbled" away by an amount $\tau_1$ to give the next half cycle. As will be seen hereinafter, the finite amount "nible" away is constant and determined by the frequency of clock pulses derived from a precision oscillator.

Instead of having each half period of the square wave of successively shorter duration, the shortening may be done cycle by full cycle, as shown in wave form B. Here, the first cycle consists of half cycles T, and this cycle is followed by a shorter cycle whose half periods are $T-\tau_2$.

The third cycle is shortened by a similar amount, and its half periods are $T-2\tau_2$.

An alternative shortening process is shown in wave form C. The shortening here takes place in sets of two complete cycles so that the first four half periods have a duration T, the next four half periods have a duration $T-\tau_3$, and so on. Thus, wave form A shows the case where each half cycle is reduced or "nibbled" away by an amount $\tau_1$ from each preceding half cycle. Wave form B illustrates the case where both half cycles of each full cycle are "nibbled" away by an amount $\tau_2$ from both preceding half cycles, and wave form C represents the situation where consecutive sets of four half cycles are "nibbled" away by an amount $\tau_3$.

Since the shortening or "nibbling" process is applied more frequently in wave form A, each incremental reduction need not be as large as in the case of wave forms B and C in order to have the signal swept upwardly through the same frequency range in the same period of time. If the modulation sweep range represents a very small percentage of the center frequency of the "chirp," its staircase slope, that is, its plot of frequency versus time, will not deviate from linearity. Otherwise, the staircase curve will take on a nonlinear appearance.

Figure 1:
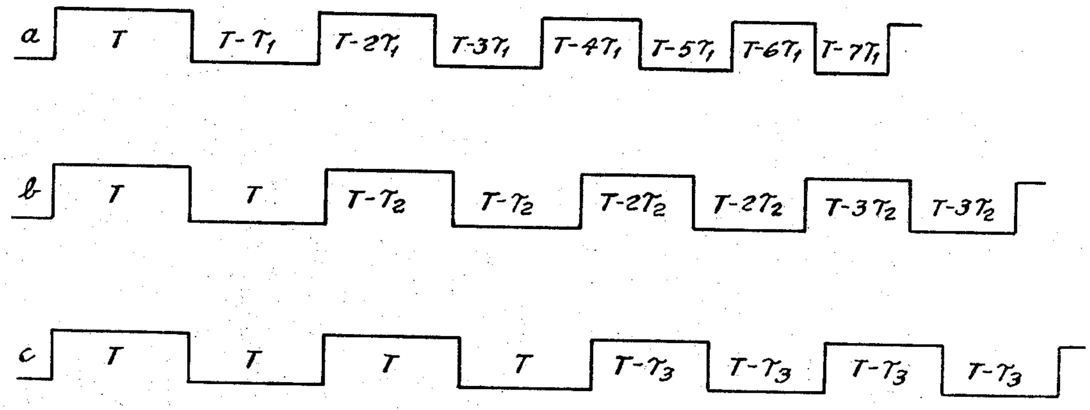
FIG. 1 illustrates a series of square wave forms helpful in understanding the digital "nibbling" technique employed in the present invention to generate upsweep frequency modulated signals.
Figure 2:
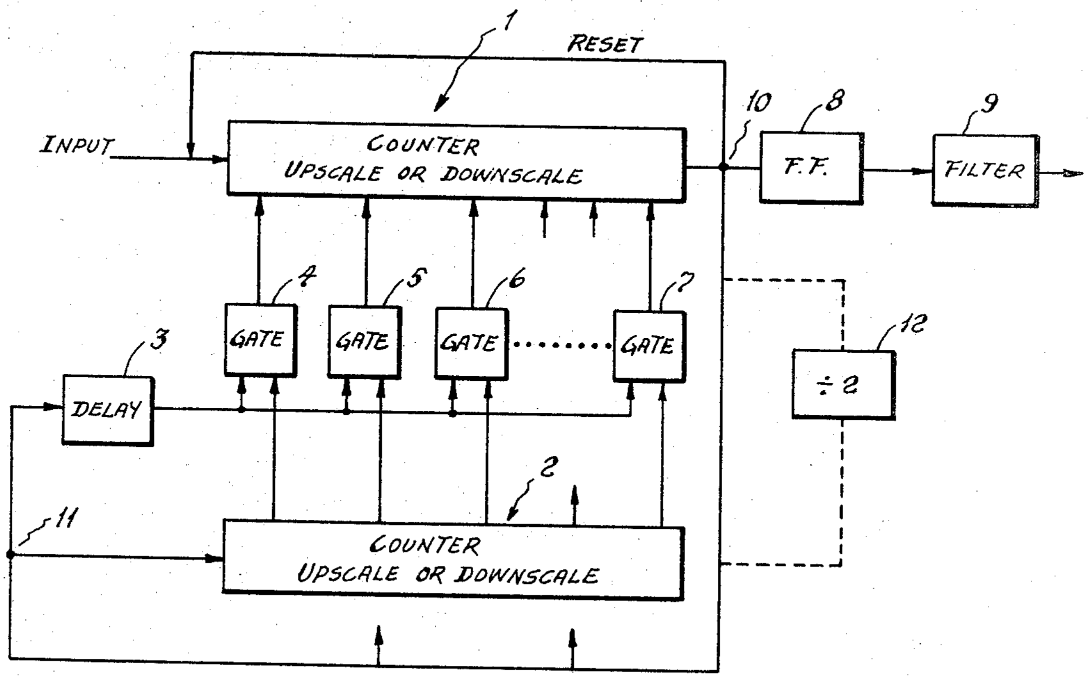
FIG. 2 is a block diagram of a circuit for producing the wave forms of FIG. 1.

FIG. 2 is a block diagram of a system which may be employed to generate either upsweep or downsweep frequency modulated wave forms of the type illustrated in FIG. 1. The mode of operation of this system depends upon counters 1 and 2 and whether they are both upscale, both downscale, or upscale and downscale types.

If upper counter 1 and lower counter 2 are both upscale, the circuit operates as follows: Clock pulses from a precision oscillator, not shown, having a preselected repetition rate, are fed to upper counter 1 and the count registered therein is periodically advanced from a preset count, here zero for purposes of simplifying the description, to a so-called "full count" level. This counting cycle and successive counting cycles, with the individual steps ignored, is shown by the solid line in FIG. 3, and the time it takes to attain the first "full count" level, as indicated, is made to correspond to the longest period T of the wave form A, for example.

When the "full count" level is reached, a control pulse is produced, in this case at the last stage of the counter, and this pulse is sent to lower counter 2. Counter 2, therefore, if it, too, is an upscale counter, is advanced once for every "full count" registered in counter 1. The control pulse is also fed to a delay circuit 3 so that a short time after lower counter 2 is advanced and upper counter 1 is reset, a transfer action occurs which, in effect, resets upper counter 1, not to zero, its previous setting, but to the count now stored in lower counter 2. This transfer action is accomplished by means of a series of gates 4, 5, 6, etc., interconnected between corresponding stages of counters 1 and 2. Thus, for example, if counter 1 has registered three full counts or experienced three complete cycles and counter 2 has the number "3" stored therein denoting this, gates 4 and 5 connected to the first two stages of counter 2 are conditioned and the previous control pulse, now appearing at the output side of delay circuit 3, passes through both of these gates and sets counter 1 to this same number.

Figure 3:
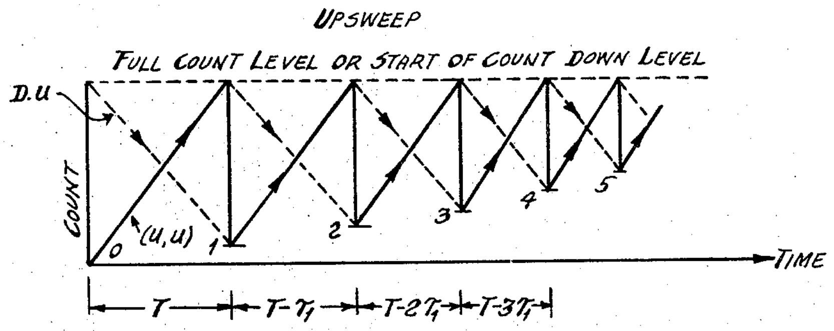
FIG. 3 shows how an upper, upscale counter in the system of FIG. 2 may be cycled to generate an upsweep wave form.

Counter 1, therefore, initially starts from a preset number, which is "0," and as shown in FIG. 3 by the solid line, counts to a preselected higher number represented by the "full" count level. This is done the first time in a time interval T, the longest half period of the frequency modulated signal where this signal is to have an upsweep. The second time around, counter 1 starts at "1" and again proceeds to the full count level. The counting time is now shortened to $T-\tau_1$, where $\tau_1$ corresponds to the time interval between adjacent clock pulses. The third time around, counter 1 starts at "2," the fourth time at "3," and so forth, with the successive counting times being progressively shortened by a one-count interval and equalling $T-2\tau_1$, $T-3\tau_1$, $T-4\tau_1$, and so forth. Each "nibble," thus, taken from the preceding half cycle has the same incremental length and all increments are logically derived from the precision master oscillator which is the clock pulse source. Thus, the precision of the "chirp" signal is related to the stability of the master oscillator.

To develop the wave form A of FIG. 1, the time modulated control pulses produced at the "full" count levels are fed to a bistable flip-flop 8. This flip-flop generates the square wave form. In instances where a sinusoidal shaped signal is required, the square wave signal may be applied to a band-pass filter 9 which passes the set of swept instantaneous fundamental frequencies associated with each instantaneous swept square wave and rejects all higher harmonics. Since this square wave is composed of only odd harmonics, a third and higher harmonics will experience considerable attenuation. To produce higher or lower frequency sweeps than those directly derived from the circuit of FIG. 2, the signal output produced may be beaten against a suitable fixed frequency to obtain sum and difference signals.

In the operation of the system of FIG. 2, counter 1 must be reset after it has reached a "full" count level, and this is done between input clock pulses. A pulse derived from each control pulse and slightly delayed therefrom may accomplish this resetting. The resetting time interval, the carry time interval, the counter resolution interval as well as the time interval needed to transfer data from the lower counter to the upper counter, all tend to restrict the above signal generating process to lower frequency sweeps. However, as noted hereinbefore, higher frequencies can be produced by frequency mixing and multiplication techniques. Also, the over-all time delay interval may be improved if the counters employed are fast-carry types and do not appreciably suffer from ripple-through or carry time effects.

In order to produce the wave form B of FIG. 1, it is only necessary to insert a scale-of-two divider 12 between points 10 and 11 of FIG. 2. Such a divider will have the effect of advancing the count in counter 2 once for every two "full" counts registered in counter 1. Likewise, to produce the wave form C in FIG. 1, two such dividers or a divide-by-four counter should be positioned at this same location. The divider which is introduced in this portion of the system, of course, need not be limited to even number division but may take the form of an even or odd full number divider.

In the above description, counter 1 started from a "0" count, and the count ended when the last stage was switched from a "0" to a "1" state. Thus, the counter did not reach the highest count registerable therein. This mode of operation was selected for description purposes and is preferred since the control pulse may be obtained directly from the last stage of the counter. However, it should be recognized that the counter may start from any preset number, count to any higher preselected number, and then be reset to any number higher or lower than the original preset number.

These upsweep wave forms may also be generated by replacing upscale counter 1 with a downscale counterpart. With such a substitution, counter 1 would follow the cycle shown by the dashed line in FIG. 3. Thus, it would start with a particular count registered therein, count down to a lower number, such as 1, be reset to its original count, then count down to 2, and so forth, with each counting cycle again being shortened by the same incremental amount corresponding to an interclock pulse spacing.

The various wave forms so far produced all have constantly reduced periods, and the frequency modulating signals resulting therefrom have upsweeps. However, an equivalent "nibbling" technique may be employed to produce wave forms having constantly increasing periods. Thus, instead of "nibbling" off increments, increments may be constantly tacked on to produce a frequency modulated wave form with a downsweep. To produce such downsweep frequency modulated signals, it is only necessary to employ a downscale counter for counter 2 in the system of FIG. 2. Counter 1 may be either a downscale or upscale unit.

Figure 4:
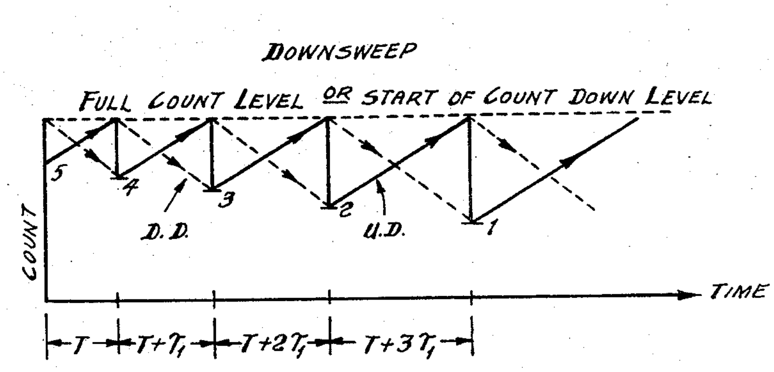
FIG. 4 illustrates how an upper, downscale counter in the system of FIG. 2 may be cycled to generate a downsweep wave form.

With counter 2 a downscale counter and counter 1 an upscale one, the operation of the system is as follows: Upper counter 1 is initially set to a preselected number, not zero, and the input pulses again advance the count registered therein until a "full count" level is reached. The solid line in FIG. 4 shows the cycle of operation of this counter where it starts with an original count of 5 registered therein. The control pulse marking the occurrence of a "full count" in upper counter 1 is again fed to delay circuit 3 and lower counter 2. However, in this modification, counter 2 has a preset number registered therein corresponding, for example, to that preset into counter 1, and each control pulse, instead of advancing the count from this number, now reduces it by a single number. Consequently, when upper counter 1 is reset for the second cycle, the delayed control pulse appearing in the output of the delay circuit now sets it to a number one less than that originally preset into it.

The successive counting cycles of upper counter 1 are shown in FIG. 4 by the solid line. As seen in this figure, the first cycle starts at count 5, for example, and reaches the "full" count level in the time interval T, the shortest half period of the "chirp" signal. Due to the operation of downscale counter 2, the next counting cycle starts at "4" and proceeds at the same rate up to the "full" count level. The time interval now is equal to $T+\tau_1$, where $\tau_1$ again corresponds to the time interval between adjacent clock pulses. In the third cycle, counter 1 starts from "3" and in the fourth cycle, "2," and so forth, so that the counting time progressively increases by the same incremental amounts $\tau_1$ to give the downsweep desired. The downsweep wave form may also be produced with both counters 1 and 2 of the downscale type. This mode of operation should be apparent from the descriptions hereinbefore given. The counting cycle for upper counter 1 in this case would follow the dashed line of FIG. 4.

In the arrangements hereinbefore discussed, the incremental bit, either "nibbled" from or added to the initial period or cycle of the square wave form, corresponded to a one-count interval or the time between adjacent clock pulses. This was due to the fact that the counter which controlled the setting of the input counter was advanced or set back one count for each cycle. However, it should be understood that these increments may be made equal to any preselected number of clock intervals by appropriately feeding the control pulses to the different stages of the second counter so as to advance this counter or retard it by any multiple count for each control pulse.

Obviously many modifications and variations of the present invention are possible in the light of the above teachings. It is therefore to be understood that within the scope of the appended claims the invention may be practiced otherwise than as specifically described.

What is claimed is:

1. A system for generating a frequency modulated wave form comprising, in combination, a pulse counter;

means for supplying regularly recurring pulses to said counter so as to change the count registered therein in each counting cycle from a first preset number to a second number and for producing a control pulse when said second number is attained;

means for resetting said pulse counter after a preselected number of control pulses have geen produced to different preset numbers in the following counting cycles, said preset numbers being removed from said first preset number by progressively larger numerical amounts so that either an increasing or decreasing number of pulses are required to advance the pulse counter from these different preset numbers to said second number in these cycles, depending upon whether these preset numbers are approaching or are receding from said second number; and means for generating a wave form whose half periods correspond to the time interval between adjacent control pulses.

2. In a system as defined in claim 1 wherein said means for resetting said pulse counter includes a second pulse counter;

means for supplying control pulses to said second pulse counter to have the count registered therein progressively change by an amount proportional to the number of times said first pulse counter has attained said second number; and means for transferring the count registered in said second pulse counter to said first pulse counter a finite time after a preselected number of control pulses are produced.

3. In an arrangement as defined in claim 2, wherein said means for transferring the count includes a gate circuit interconnecting selected stages of said first and second pulse counters, said gate circuits conditioning said first pulse counter in accordance with the count registered in said second pulse counter such that when said gates are activated by a transfer pulse the preset number transferred to said first pulse counter corresponds to the count then registered in said second pulse counter;

a delay device;

means for feeding control pulses to the input of said delay device; and means for feeding the output of said delay device to said gates thereby to activate all of said gates simultaneously.

4. In an arrangement as defined in claim 3 wherein only one of a predetermined number of control pulses is fed to the input of said delay device, whereby said first counter is reset to different preset numbers after a plurality of control pulses are produced.

5. In an arrangement as defined in claim 2 wherein said first pulse counter is an upscale counter;

said second pulse counter is an upscale counter; and said second number is numerically higher than said first preset number, whereby the wave form generated has an increasing frequency.

6. In an arrangement as defined in claim 2 wherein said first pulse counter is an upscale counter;

said second pulse counter is a downscale counter; and said second number is numerically higher than said first preset number, whereby the wave form generated has a decreasing frequency.

7. A system for generating a frequency modulated wave form comprising, in combination, a first counter;

means for periodically changing the count registered therein by incremental amounts from a first preset number to a preselected different number and for producing a control pulse when said preselected different number is reached;

means for resetting said counter after it reaches said preselected different number to a different preset number which is removed by progressively larger numerical amounts from said first preset number, whereby the time between the production of adjacent control pulses is changed;

said means for resetting said counter including a second counter, means for feeding control pulses to said second counter thereby to register therein the number of times said first counter has reached said preselected different number, a multiplicity of gates, said gates being interconnected between said first and second counters such that when said second counter has a particular count registered therein gates corresponding to these counts are conditioned, and means for feeding control pulses slightly delayed in time to each of said gates such that said delayed control pulses pass through said conditioned gates and sets said first counter to the count then registered in said second counter; and means for generating a wave form whose half periods equal the time interval between adjacent control pulses.

References Cited

UNITED STATES PATENTS

| | | | |
|---|---|---|---|
| 3,048,714 | 8/1962 | Poole | 332—14X |
| 3,375,448 | 3/1968 | Newman et al. | 328—46X |
| 3,422,374 | 1/1969 | Rosener | 328—48X |
| 3,431,499 | 3/1969 | Godfrey | 328—46X |
| 3,453,551 | 7/1969 | Haberle | 328—41X |

JOHN S. HEYMAN, Primary Examiner

U.S. Cl. X.R.

235—92; 328—44, 48; 332—9